United States Patent

[11] 3,602,954

| [72] | Inventor | Heinz Gerlach |
| | | 12 Billeweg, 2057 Wentorf, Germany |
| [21] | Appl. No. | 861,324 |
| [22] | Filed | Sept. 26, 1969 |
| [45] | Patented | Sept. 7, 1971 |
| [32] | Priority | Oct. 31, 1968 |
| [33] | | Germany |
| [31] | | P 18 06 247.0 |

[54] ANNULAR HOSE CLIP
1 Claim, 3 Drawing Figs.

[52] U.S. Cl. ............................................ 24/20 CW
[51] Int. Cl. .............................................. B65d 63/02
[50] Field of Search ............................... 24/16 PB, 20 R, 20 CW, 284

[56] References Cited
UNITED STATES PATENTS

| 1,116,049 | 11/1914 | Feeny | 24/284 |
| 2,183,551 | 12/1939 | Dold | 24/284 |
| 3,283,378 | 11/1966 | Cramton | 24/16 PB |
| 3,464,722 | 9/1969 | Larkin | 24/284 X |
| 3,475,793 | 11/1969 | Oetiker | 24/20 CW |

FOREIGN PATENTS

| 977,757 | 12/1964 | Great Britain | 24/20 CW |
| 1,046,710 | 10/1966 | Great Britain | 24/20 CW |

*Primary Examiner*—Donald A. Griffin
*Attorney*—Young & Thompson

ABSTRACT: A simplified annular hose clip is constructed by two or more tab-shaped lug portions comprising separate, identical component parts, and one end of each of said component parts is formed as a lug portion while the other end of said component parts which serves as a clamping means is without any special design but has substantially the form of the main portion of said component parts. The component parts are connectable to one another to form the hose clip in which each of the ends, which serve as the clamping means, lies under the lug portion of the adjacent component part. Assembly of at least two of the component parts into the desired hose clip can be very easily achieved in such a way that the ends of the lug portion of any component part which overlie the other ends of the respective adjacent component parts, are securely fixed, e.g. by welding or otherwise connecting them to one another.

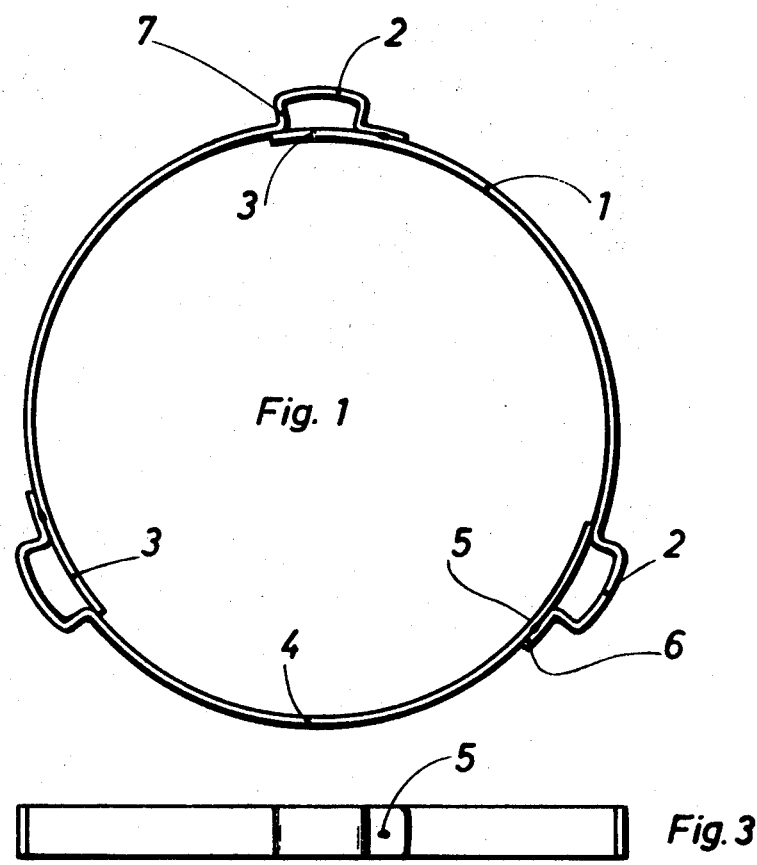

ANNULAR HOSE CLIP

This invention relates to annular hose clips which have two or more tab-shaped lug portions and clamping members covering the hose beneath the lug portions.

It is an object of the invention to simplify annular hose clips which have two or more lug portions so that the minimum of material, tools and time are required for their manufacture.

Another object of the invention is to provide annular hose clips of this kind which are easy to produce, by mass production methods without having the disadvantage that the hose material may be pinched or otherwise damaged when the lug portions are closed together.

Yet another object of the invention is to provide hose clips which can be manufactured from comparatively inexpensive extruded material.

Other and further objects of the present invention will appear from the following description in which reference is to be had to the accompanying drawings, constituting a part of this specification, in which similar characters of reference denote corresponding parts in all the views, and in which:

FIG. 1 shows a hose clip according to the invention;

FIG. 2 shows one of its component parts;

FIG. 3 is a side view of the hose clip of FIG. 1.

An annular hose clip 1 is shown with three tab-shape or bail-like lug portions 2. The hose, which is not shown, is covered in use by clamping portions 3 which are located under the lug portions 2.

The hose clip 1 is formed from three identical ones of the part 4 shown in FIG. 2, which gives considerable simplification in forming and production of the clips as only one type of component part has to be made.

The component part 4, has the lug portion 2 at one end and the clamping part 3 at the other end, the clamping part serving in the hose clip as a hose cover underneath the lug portion 2 of the next part 4.

Interconnection of the component parts 4 into a hose clip 1 is achieved in such a way that a lug portion 2 of one component part 4 always overlies the end 3 of the next component part, a rivet or spot weld 5 being positioned adjacent an end portion 6 of the lug portion 2 of the component part.

When the lug portions 2 are crimped together, for example by means of ordinary pliers, in order to form a hose connection, one of the small sides 7 of the lug portion 2 slides upon the clamping portion 3, so that the hose cannot be pinched in the lug portion 2 and therefore damaged.

By forming the hose clips from identical parts 4, not only is the production of such clips simplified, but also the clips have only as many joints 5 as there are lug portions 2.

The sleeve according to the invention can be made from any flexible plastics material or even from another elastic material, for example sheet steel; for processing reasons and for the purpose of a simple constructions, a plastics material such as, for example, a polyamide, polyethylene or polypropylene or even a polyvinyl chloride or polyester material or the like is preferably used as the structural material for the sleeve according to the invention.

Although I have illustrated a specific hose clip, it is apparent that the invention is not limited to the specific form of construction illustrated, but may be embodied as well in other forms of construction within the scope of the appended claims.

I claim:

1. An annular hose clip comprising at least two separate, identical integral arcuate component parts which are connectable end to end to one another to form said hose clip, one end of each of said component parts is provided in the form of a hat-shaped circumferentially contractable lug portion, and the other end of said component parts lies under and abuts said lug portion of the adjacent component part, in the interconnected state of the component parts.